(12) United States Patent
Ball

(10) Patent No.: US 12,669,847 B2
(45) Date of Patent: Jun. 30, 2026

(54) PORTABLE DISPLAY APPARATUS AND WEARABLE MEDIA DISPLAY SYSTEM

(71) Applicant: Corey Ball, Glenn Dale, MD (US)

(72) Inventor: Corey Ball, Glenn Dale, MD (US)

( * ) Notice: Subject to any disclaimer, the term of this patent is extended or adjusted under 35 U.S.C. 154(b) by 99 days.

(21) Appl. No.: 18/809,623

(22) Filed: Aug. 20, 2024

(65) Prior Publication Data

US 2025/0068211 A1      Feb. 27, 2025

Related U.S. Application Data

(60) Provisional application No. 63/534,486, filed on Aug. 24, 2023.

(51) Int. Cl.
*G06F 1/16* (2006.01)

(52) U.S. Cl.
CPC .................................... *G06F 1/163* (2013.01)

(58) Field of Classification Search
CPC ....................................................... G06F 1/163
See application file for complete search history.

(56) References Cited

U.S. PATENT DOCUMENTS

| | | | | |
|---|---|---|---|---|
| 4,158,490 A | * | 6/1979 | Gottschalk | F16M 11/2092 |
| | | | | 396/420 |
| 4,689,604 A | * | 8/1987 | Sokol | G09G 3/005 |
| | | | | 345/82 |
| 5,057,827 A | * | 10/1991 | Nobile | G09G 3/005 |
| | | | | 349/1 |

| | | | | |
|---|---|---|---|---|
| 5,222,642 A | * | 6/1993 | Solarz | A45F 3/04 |
| | | | | D3/217 |
| 5,390,246 A | * | 2/1995 | Gay | G11B 27/102 |
| | | | | 381/333 |
| 5,690,411 A | * | 11/1997 | Jackman | G08B 5/006 |
| | | | | 362/108 |
| 5,762,251 A | * | 6/1998 | Gleason | A45F 3/047 |
| | | | | 224/644 |
| 5,774,338 A | * | 6/1998 | Wessling, III | G06F 1/163 |
| | | | | 361/733 |

(Continued)

FOREIGN PATENT DOCUMENTS

| | | |
|---|---|---|
| EP | 1465126 A2 | 10/2004 |
| WO | 2023089641 A1 | 5/2023 |

*Primary Examiner* — Adrian S Wilson
(74) *Attorney, Agent, or Firm* — THE LAW FIRM OF ANDREA HENCE EVANS, LLC

(57) ABSTRACT

A portable display apparatus may comprise an enclosure with top and base portions. A computer processing unit (CPU), control logic, and memory may be located within the enclosure. These components may be in communication with each other. A display apparatus may be positioned within the enclosure. The display apparatus may include at least one screen. A hologram generator may be positioned within the enclosure. The hologram generator may comprise a telescopic pole for displaying a hologram above the enclosure. A pulley system may be included for stability and transport of the portable display apparatus. The display apparatus may comprise a high-resolution media player. The media player may display various types of media content. The CPU may be in communication with digital and electronic components of the portable display apparatus. The CPU may control the operation of these components.

18 Claims, 14 Drawing Sheets

(56)                References Cited

U.S. PATENT DOCUMENTS

| | | | |
|---|---|---|---|
| 5,806,740 A * | 9/1998 | Carlson | A45F 3/06 |
| | | | 224/259 |
| 5,892,445 A * | 4/1999 | Tomich | G08B 5/004 |
| | | | 362/108 |
| 5,912,653 A * | 6/1999 | Fitch | G09G 3/3611 |
| | | | 40/586 |
| 6,015,076 A * | 1/2000 | Pennington | A45F 3/08 |
| | | | 224/644 |
| 6,018,899 A * | 2/2000 | Hanitz | G09F 13/20 |
| | | | 40/431 |
| 6,037,876 A * | 3/2000 | Crouch | G09F 9/33 |
| | | | 340/815.53 |
| 6,047,301 A * | 4/2000 | Bjorklund | G06F 1/163 |
| | | | 361/730 |
| 6,057,966 A * | 5/2000 | Carroll | G02B 27/0172 |
| | | | 359/630 |
| 6,115,006 A * | 9/2000 | Brotz | H04N 13/398 |
| | | | 348/E13.058 |
| 6,278,419 B1 * | 8/2001 | Malkin | G09G 3/005 |
| | | | 348/E13.056 |
| 6,843,012 B1 * | 1/2005 | Dodd | G09F 21/02 |
| | | | 40/586 |
| 6,856,303 B2 * | 2/2005 | Kowalewski | G09G 3/005 |
| | | | 345/82 |
| 6,882,117 B1 * | 4/2005 | Hughes | G09F 9/33 |
| | | | 315/360 |
| 7,133,002 B2 * | 11/2006 | Langlois | G09F 21/02 |
| | | | 40/586 |
| 7,322,452 B2 * | 1/2008 | Nykoluk | A45C 13/262 |
| | | | 16/113.1 |
| 8,888,499 B2 * | 11/2014 | Goldwater | G09F 19/10 |
| | | | 434/376 |
| 9,289,018 B2 | 3/2016 | De Mattei et al. | |
| 10,304,307 B2 * | 5/2019 | Balbach | F16P 3/144 |
| 10,636,389 B2 * | 4/2020 | Gilbert | B60Q 1/326 |
| 10,783,559 B1 | 9/2020 | Tran | |
| 11,054,114 B1 * | 7/2021 | Kelly | G09F 13/34 |
| 11,222,559 B2 | 1/2022 | Chykeyuk et al. | |
| 11,808,405 B2 * | 11/2023 | Cook | F16M 13/04 |
| 2001/0024326 A1 * | 9/2001 | Nakamura | H04N 9/3185 |
| | | | 348/E9.027 |
| 2002/0135541 A1 * | 9/2002 | Kowalewski | G09G 3/005 |
| | | | 345/204 |
| 2003/0231166 A1 * | 12/2003 | Langlois | G09F 21/02 |
| | | | 345/169 |
| 2005/0156003 A1 * | 7/2005 | Nykoluk | A45C 13/262 |
| | | | 190/115 |
| 2006/0033847 A1 * | 2/2006 | Kim | F16M 11/2021 |
| | | | 348/836 |
| 2006/0261207 A1 * | 11/2006 | Woodruff | F16M 11/40 |
| | | | 242/473.3 |
| 2007/0166148 A1 * | 7/2007 | Middleton | F04D 29/005 |
| | | | 415/118 |
| 2007/0216600 A1 | 9/2007 | Langlois | |
| 2009/0051561 A1 | 2/2009 | Cadavid | |
| 2011/0029359 A1 * | 2/2011 | Roeding | G01S 5/02 |
| | | | 705/14.1 |
| 2013/0229392 A1 * | 9/2013 | Weiss | G06F 3/03545 |
| | | | 345/179 |
| 2014/0154660 A1 * | 6/2014 | Goldwater | G09B 25/00 |
| | | | 434/401 |
| 2016/0140936 A1 * | 5/2016 | Gilbert | B60Q 1/326 |
| | | | 345/419 |
| 2016/0320795 A1 * | 11/2016 | Daley, III | G06F 1/1698 |
| 2017/0229050 A1 * | 8/2017 | Butler | H04M 1/0254 |
| 2019/0141280 A1 * | 5/2019 | Bottomly | B60R 11/0235 |
| 2019/0371217 A1 | 12/2019 | Chykeyuk et al. | |
| 2020/0387929 A1 | 12/2020 | Zhu et al. | |
| 2022/0318850 A1 | 10/2022 | Bastiyali | |
| 2024/0331595 A1 * | 10/2024 | Zhuravliov | F21S 4/28 |

* cited by examiner

4

9

13

PORTABLE DISPLAY APPARATUS AND WEARABLE MEDIA DISPLAY SYSTEM

CROSS-REFERENCE TO RELATED APPLICATIONS

This application claims the benefit of U.S. Provisional Application No. 63/534,486, filed Aug. 24, 2023, which is incorporated herein by reference in its entirety.

FIELD OF THE INVENTION

The present invention relates generally to a portable display apparatus for displaying advertisements, specifically, a mobile digital marketing apparatus that are used to advertise commercial products in the field of interactive marketing which may also incorporate the use of holograms generated by the portable display apparatus. The present disclosure relates to wearable display systems. More particularly, the present disclosure relates to a wearable media display system for brand ambassadors to engage consumers.

BACKGROUND OF THE INVENTION

This invention relates generally to digital interactive market and electronic visual projection screens and hologram displays of industry product marketing. This invention incorporates an array of marketing technology that embodies all the digital marketing into one concept to give the public a one stop feed of the visual and verbal interactive response to their request of products that are new to the market. The public usually would have to go to multiple product displays to get the information they are looking for or have not seen what is new in the product industry. As such, there is a need for an advertising/marketing platform that meets customers where they are. There is also a need for an advertising/marketing platform that is interactive in real time with customers.

Aspects of embodiments of the present invention contemplate a portable display apparatus that, unlike billboards, posters, or transit advertisements, empowers and enables brands to meet customers where they are as the contemplated display apparatus could be transported by brand individuals at events, locations, places etc., where target audiences would be found.

Aspects of embodiments of the present invention contemplate a portable display apparatus that uses highly visible interactive screens that provide customers with dynamic content that could be adjusted based on real-time data collection.

Aspects of embodiments of the present invention contemplate a portable display apparatus that can help influence customer/consumer behavior anytime and anywhere, while elevating a brand's recognition, reaching target audiences, and receiving data-driven results.

The out of home landscape is the last media environment where the consumer does not control the advertising space. Aspects of embodiments of the present invention contemplate a portable display apparatus that enables coverage in this arena. Aspects of embodiments of the present invention also contemplate a portable display apparatus that truly integrates into the consumers' social lifestyle on a daily basis. Brand individuals transporting or carrying portable display the contemplated apparatus are enabled, by the contemplated a portable display apparatus, to deliver branded content and call-to-action programming when assigned to high-traffic areas or areas where target audiences may be found.

SUMMARY OF THE INVENTION

This invention incorporates marketing from many advertisement protocols in the industry into one new apparatus that will give advertising agencies, and vendors a totally new way to display their products to corporations and the consumer.

Aspects of embodiments of the present invention contemplate a portable display apparatus wearable by a human being ("marketing agent" or "ambassador") which is fully equipped to display media-whether full capture video with audio, scrolling images with QR Codes, or HTML via 32-inch-high resolution screens embedded in the portable display apparatus which may be custom designed. Each portable display apparatus, in aspects of embodiments of the present invention, may display a hologram image, generated by a hologram generator of the portable display apparatus, above head of the marketing agent, creating an awe-inspiring visual display for consumers.

Individuals, known as "marketing agents" or "ambassadors"[1] may be able to wear the portable display apparatus, while navigating and engaging consumers where they live, work, and play. Whether it is a Call To Action or Situational Awareness, marketing agents using the portable display apparatus are enabled to execute brand campaigns while providing real time metrics necessary to gauge Return on Investment. Each portable display apparatus unit is equipped, in an aspect of an embodiment of the present invention, with the ability to create a customized Mobility Platform to deliver rich media content and collect consumer data, when the portable display apparatus interacts with proximate consumers' mobile devices.

[1] These names/terms are not meant to be limiting in their qualification of users of the portable display apparatus.

An aspect of an embodiment of the present invention contemplates a portable display apparatus comprising: an enclosure, having top and base portions, a computer processing unit (CPU), control logic, memory, in communication with the CPU, where the CPU, control logic, and memory are located within the enclosure, a display apparatus positioned within the enclosure, where the display apparatus comprises of at least one screen, a hologram generator, positioned within the enclosure, where the hologram generator comprises of a telescopic pole for displaying a hologram above the enclosure, and a pulley system for stability and transport of the portable display apparatus.

In an aspect of an embodiment of the present invention, the display apparatus may comprise of a high-resolution media player for displaying any one or more of: video, audio, images, QR codes, HTML, interactive media.

In an aspect of an embodiment of the present invention, the CPU may be in communication with, and may control operation of digital, and electronic components or the portable display apparatus.

In an aspect of an embodiment of the present invention, the telescopic pole of the hologram generator may extend from an upper bracket of the top portion of the enclosure.

In an aspect of an embodiment of the present invention, the portable display apparatus may further include a pouch positioned towards the base portion of the enclosure. In an aspect of an embodiment of the present invention, the portable display apparatus may include a power source positioned within the pouch, where the power source may power all powered elements of the portable display apparatus.

In an aspect of an embodiment of the present invention, the portable display apparatus may further include a power source positioned within the enclosure, where the power source may power all powered elements of the portable display apparatus.

In an aspect of an embodiment of the present invention, the pulley system may comprise: a support backer board, support straps for lifting and transporting the portable display apparatus, metal clips on the support straps, and a metal bracket positioned at the base of the enclosure.

In an aspect of an embodiment of the present invention, the portable display apparatus may further include computer programmable product which may include non-transitory computer readable medium having control logic stored therein causing the CPU to operate the portable display apparatus. The data can also be stored in the cloud.

In an aspect of an embodiment of the present invention, the portable display apparatus may further include computer programmable product which may include non-transitory computer readable medium having control logic stored therein causing the CPU to use the portable display apparatus to capture consumer data from consumer mobile devices when the portable display apparatus is in close proximity with aforesaid consumer devices.

In an aspect of an embodiment of the present invention, the CPU may be configured to perform a predefined set of basic operations in response to receiving a corresponding basic instruction selected from a predefined native instruction set of code or the control logic.

In an aspect of an embodiment of the present invention, the portable display apparatus may further include computer programmable product, control logic, methods, systems, elements configured for enabling full functioning of the portable display apparatus as disclosed in the present disclosure, drawings, and any accompanying documents.

Additional aspects, objectives, features and advantages of the present invention will become apparent from the following description of the preferred embodiments with reference to the attached drawings.

DETAILED DESCRIPTION

Figure 1:
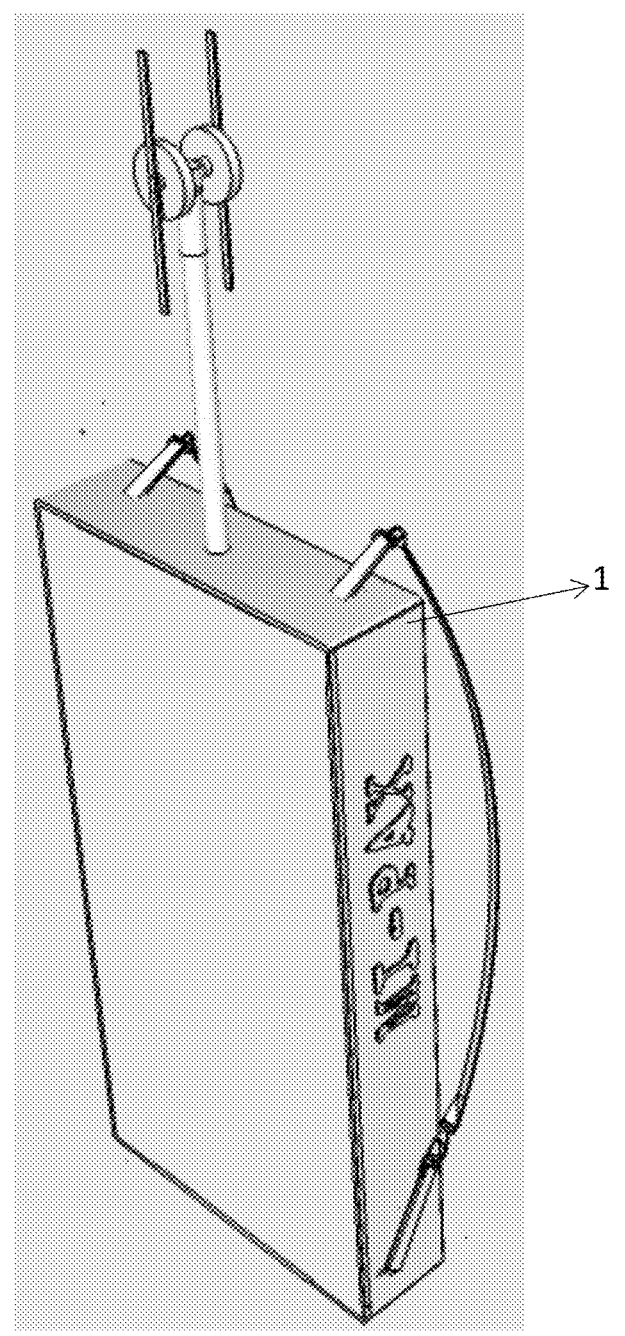
FIG. 1 illustrates a front view of a portable display apparatus according to aspect(s) of embodiment(s) of the present invention.

The present disclosure includes many aspects and features. Moreover, while many aspects and features relate to, and are described in, the context of systems and methods of fraud identification, embodiments of the present disclosure are not limited to use only in this context. The present disclosure can be understood more readily by reference to the following detailed description of the disclosure and the examples included therein.

Before the present articles, systems, apparatuses, and/or methods are disclosed and described, it is to be understood that they are not limited to specific methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise. As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

The following description of various embodiments is merely exemplary in nature and is in no way intended to limit the disclosure, its application, or uses.

Regarding the present disclosure, digital marketing and advertising technologies may continue to evolve to meet changing consumer preferences and behaviors. Traditional static displays and billboards may have limitations in capturing attention and providing rich content. While digital signage may improve engagement, it may often be fixed in one location. Brand ambassadors often engage consumers in various environments to promote products or services. Traditional methods of engagement may have limitations in capturing consumer attention and providing interactive experiences. There may be a need for improved systems that allow brand ambassadors to more effectively display media content and collect consumer data in diverse settings.

In one aspect, a wearable media display system may comprise: a custom-designed structure configured to be worn by a person; at least one display screen mounted on the structure; at least one hologram projector attached to the structure; a media player operatively connected to the display screen and hologram projector; and a battery pack for powering the system components.

The structure may include a custom designed PVC board with foam padding for comfort. A pulley system with security straps may be used to stabilize the structure on the wearer. In some implementations, the system may include both forward-facing and rear-facing display screens and hologram projectors. The system may optionally include wireless connectivity components for interacting with consumer mobile devices and collecting data.

The portable display apparatus may comprise an enclosure with top and base portions. A computer processing unit (CPU), control logic, and memory may be located within the enclosure. The CPU, control logic, and memory may be in communication with each other.

In one or more embodiments, a display apparatus may be positioned within the enclosure. The display apparatus may comprise at least one screen. The screen may be a high-resolution media player capable of displaying video, audio, images, QR codes, HTML, or interactive media. In one or more embodiments, a hologram generator may be positioned within the enclosure. The hologram generator may comprise a telescopic pole for displaying a hologram above the enclosure. The telescopic pole may extend from an upper bracket of the top portion of the enclosure.

In one or more embodiments, the portable display apparatus may include a pulley system for stability and transport. The pulley system may comprise a support backer board, support straps for lifting and transporting the apparatus, metal clips on the support straps, and a metal bracket positioned at the base of the enclosure. In one or more embodiments, a pouch may be positioned towards the base portion of the enclosure. A power source may be positioned within the pouch or within the enclosure. The power source may power all powered elements of the portable display apparatus. The CPU may be in communication with and control the operation of digital and electronic components of the portable display apparatus. The CPU may be configured to perform a predefined set of basic operations in response to receiving corresponding basic instructions selected from a predefined native instruction set of code or control logic.

In one or more embodiments, the portable display apparatus may include a computer programmable product with a non-transitory computer readable medium having control logic stored therein. The control logic may cause the CPU to operate the portable display apparatus or capture consumer data from consumer mobile devices when in close proximity. In one or more embodiments, the portable display apparatus may be designed with a pulley system for stability while accounting for weight and comfort. Custom brackets may be attached to mount holes on the rear of the screens both above and below the media player attachment. These brackets may help secure a custom designed PVC board with inserts for security straps that act as pulleys with locking devices.

In one or more embodiments, a PVC board may be covered with foam padding for comfort. The straps may secure the PVC board and foam backing to the unit and provide connection points for shoulder straps so the device may be worn by a brand ambassador. In one or more embodiments, an upper bracket may serve as an insertion point for a connection pole to which hologram devices may be attached. The hologram pole may be secured by a screw into the upper bracket, allowing the hologram devices to protrude through the top of the apparatus above the wearer's head.

In one or more embodiments, one or more hook and loop fastener strips, i.e. velcro strips, may be attached along the display screen bezel to aid in securing a "skin" composed of fabric or polycarbonate. This skin may create a bezeled appearance and enclose the components and wires. In one or more embodiments, a custom-made battery and equipment pouch may be attached to the rear of the apparatus via security hooks or a utility belt. This pouch may conceal the battery and any additional equipment such as tracking devices or Wi-Fi adapters.

In one or more embodiments, the portable display apparatus may be configured in a deluxe version with dual displays both forward and rear facing, as well as dual holograms both forward and rear facing. The deluxe version may contain a harness attaching to the shoulder strap and latches that attach to the front-facing display screen. In one or more embodiments, the apparatus may be equipped with the ability to create a customized mobility platform to deliver rich media content and collect consumer data via event attendees' mobile devices. This may allow for real-time metrics to gauge return on investment for brand campaigns.

Regarding the present disclosure, methods of using the wearable media display system to engage consumers and collect data are also disclosed. Referring now to FIGS. 1 through 14, different views of a mobile display apparatus are shown according to aspects of embodiments of the present invention.

Figure 2:
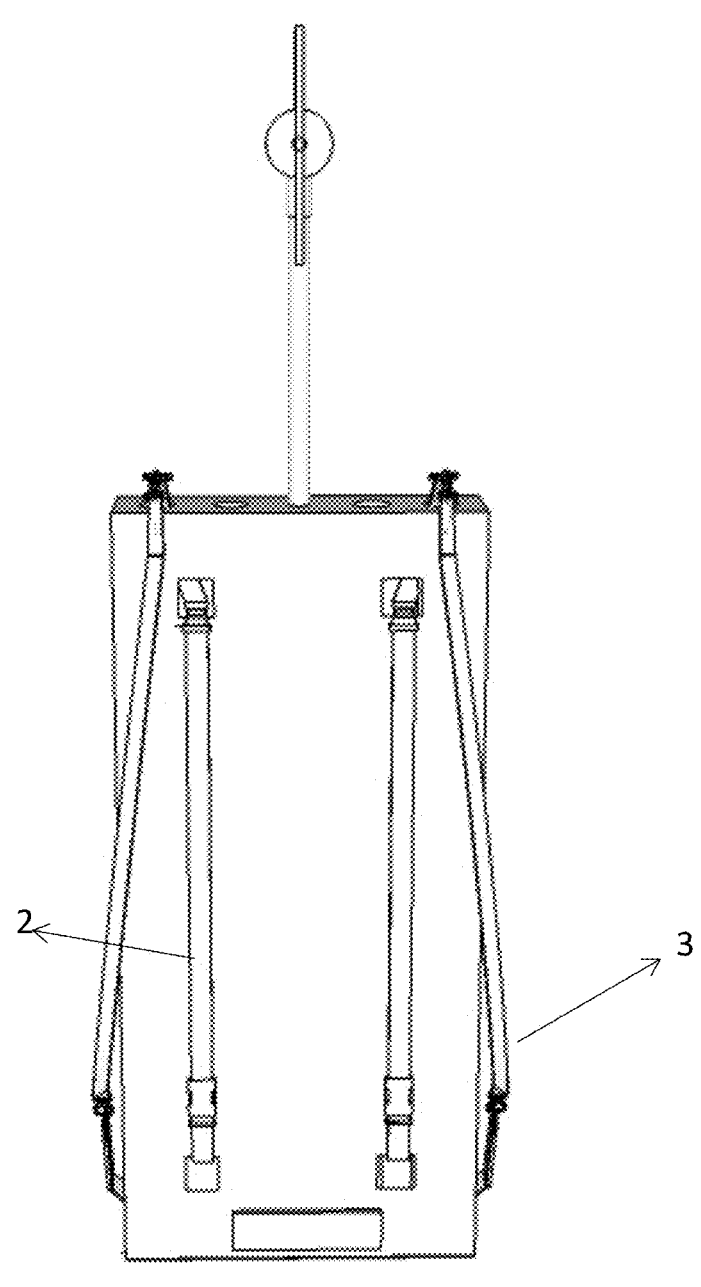
FIG. 2 illustrates a rear perspective view of a portable display apparatus according to aspect(s) of embodiment(s) of the present invention.
Figure 3:
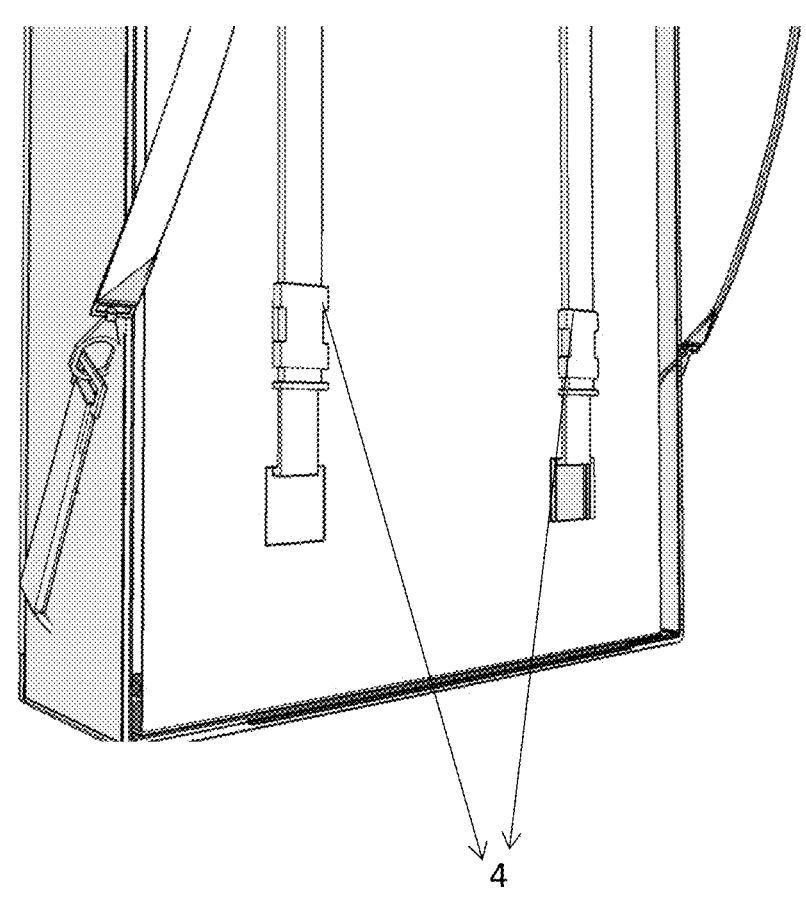
FIG. 3 illustrates a front perspective view of a portable display apparatus according to aspect(s) of embodiment(s) of the present invention.
Figure 4:
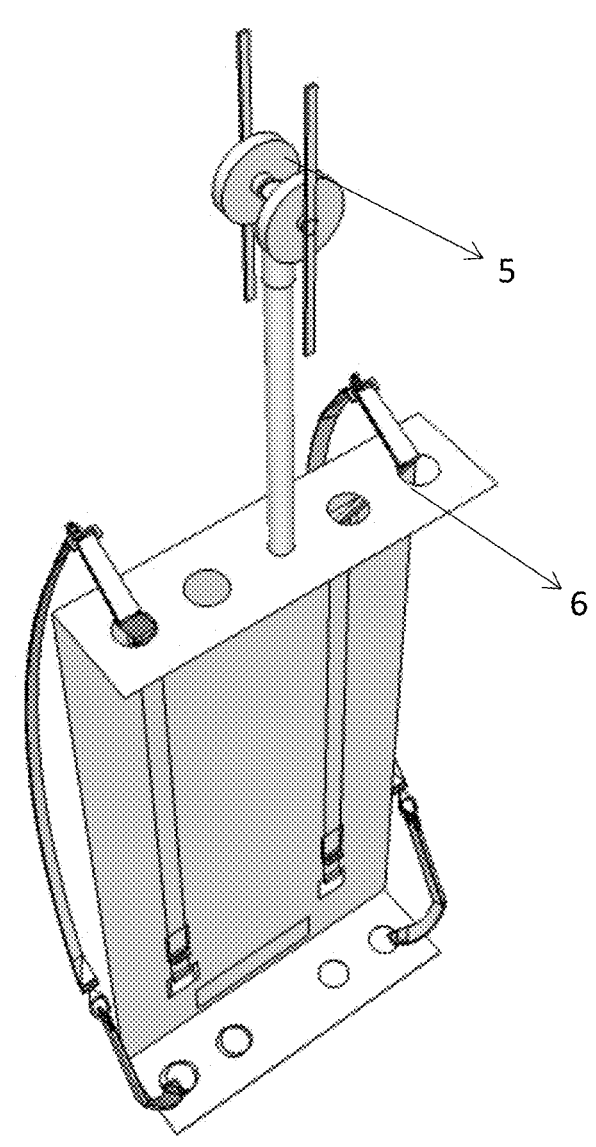
FIG. 4 illustrates a rear view of a portable display apparatus according to aspect(s) of embodiment(s) of the present invention.
Figure 5:
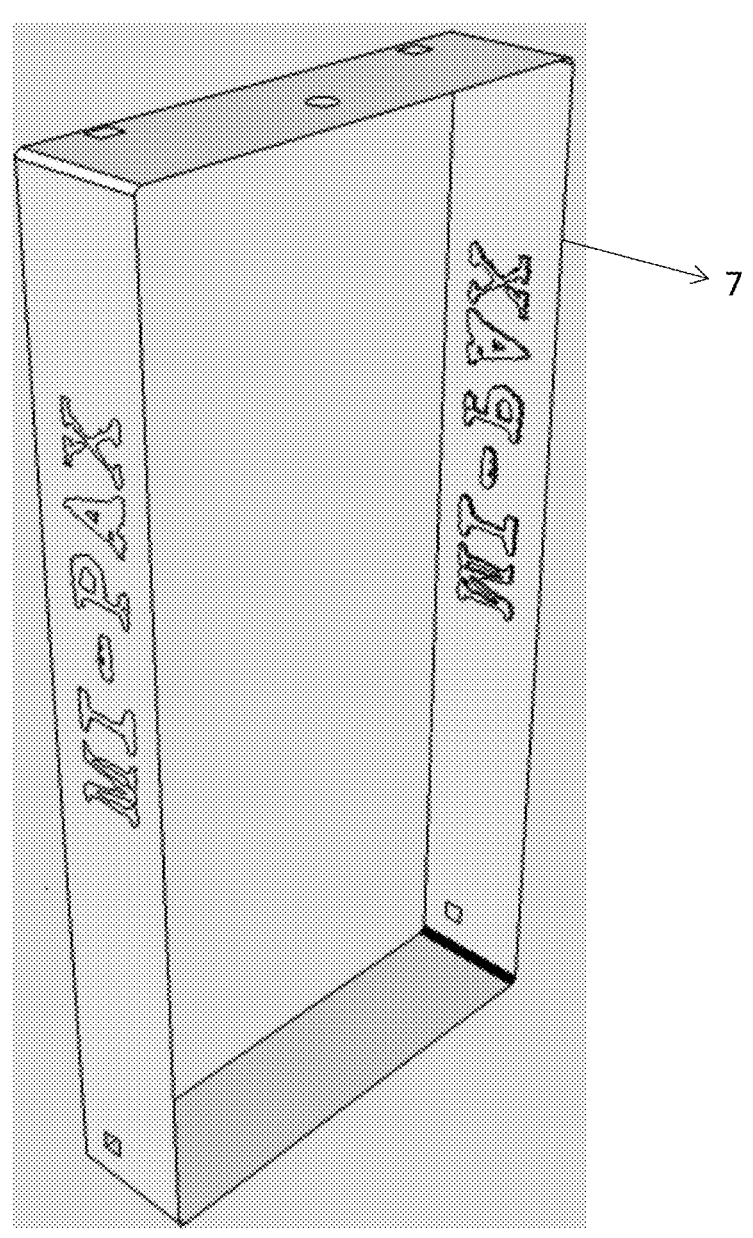
FIG. 5 illustrates a detailed rear view of a portable display apparatus according to aspect(s) of embodiment(s) of the present invention.
Figure 6:
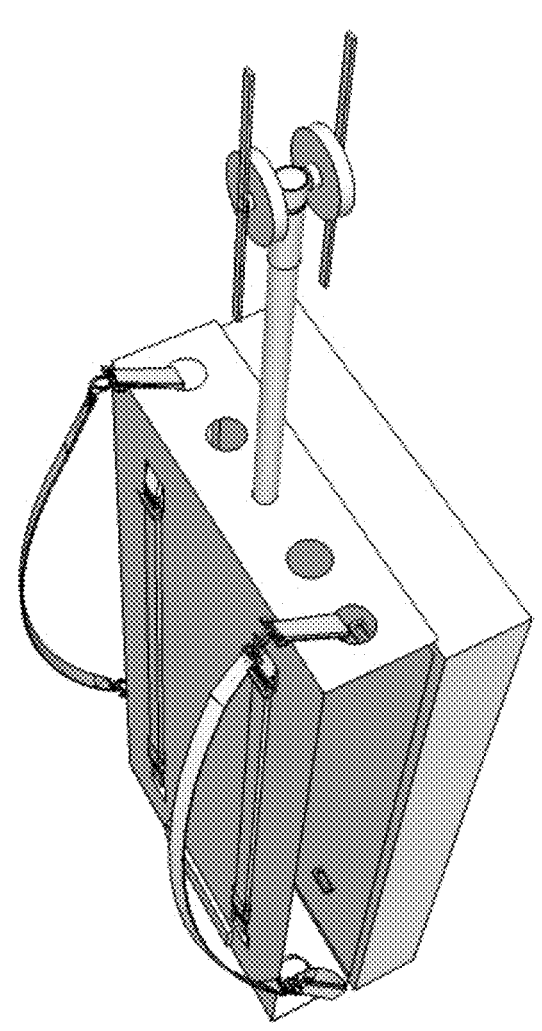
FIG. 6 shows placement of a display screen into the system structure.
Figure 7:
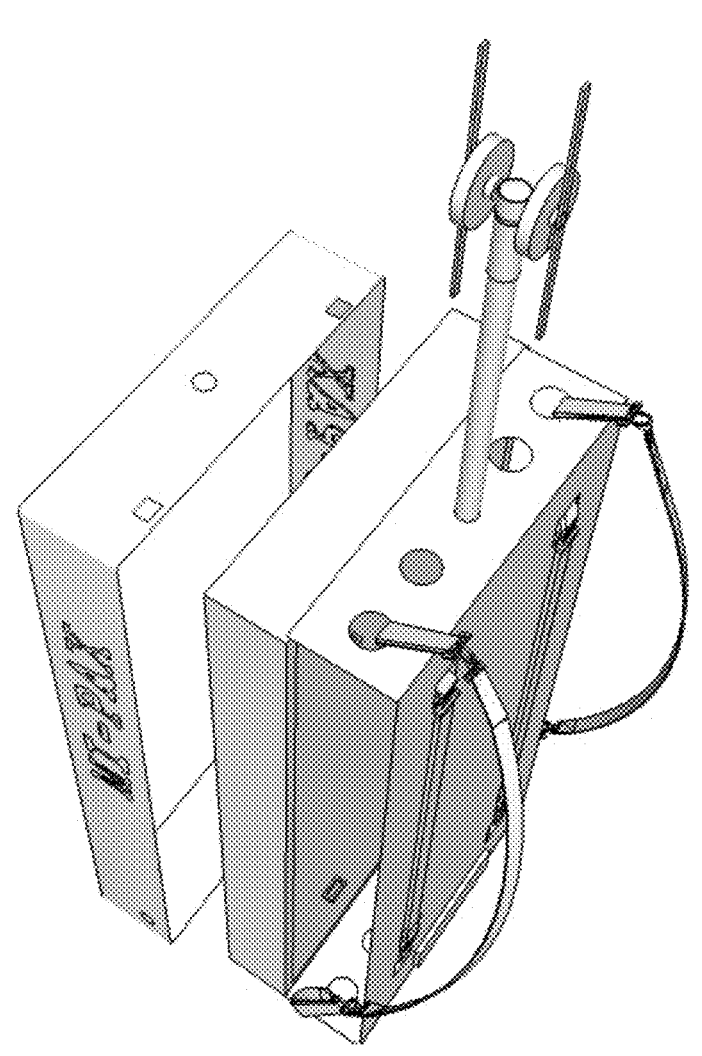
FIG. 7 shows an exploded view of system components.
Figure 8:
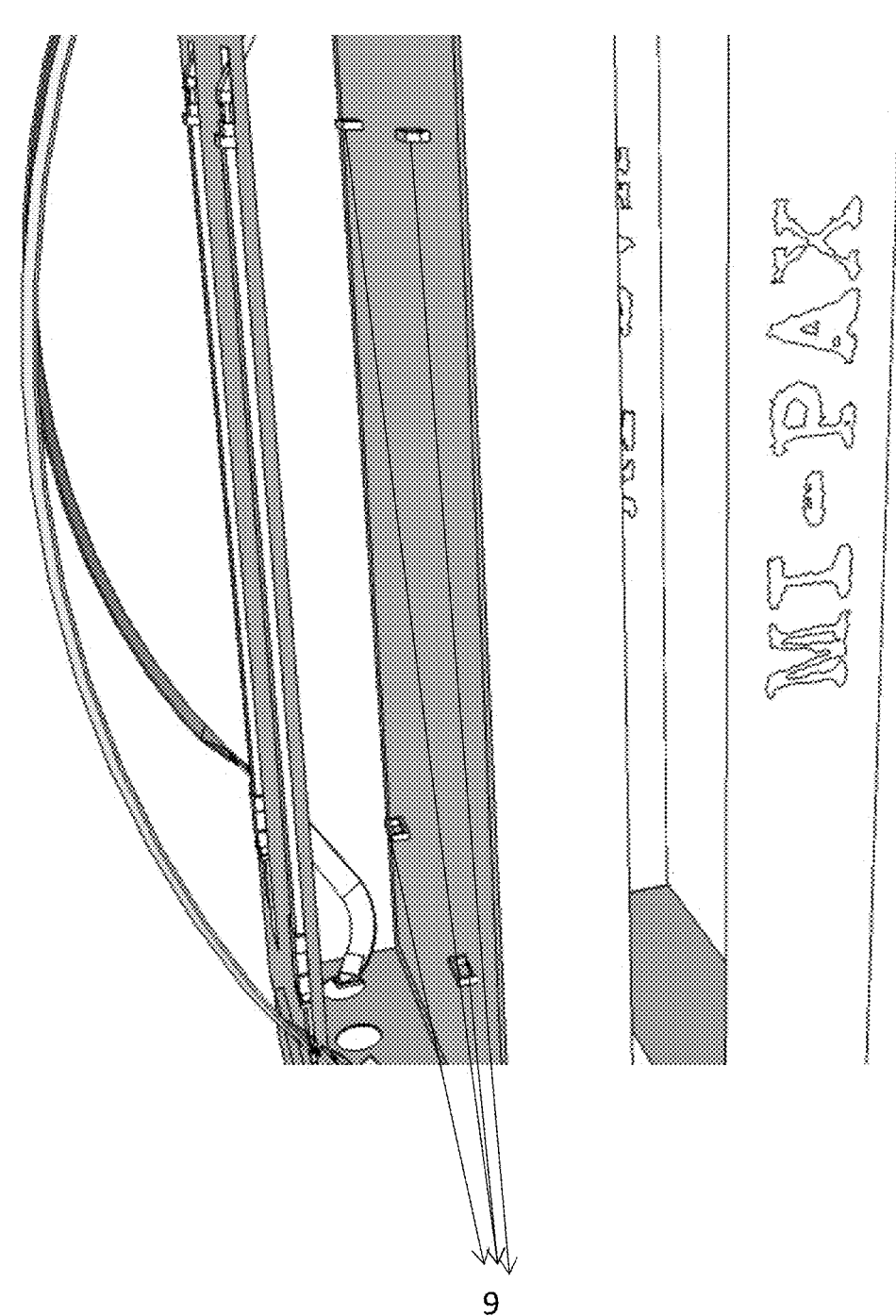
FIG. 8 shows mounting brackets on a rear side of a display screen.
Figure 9:
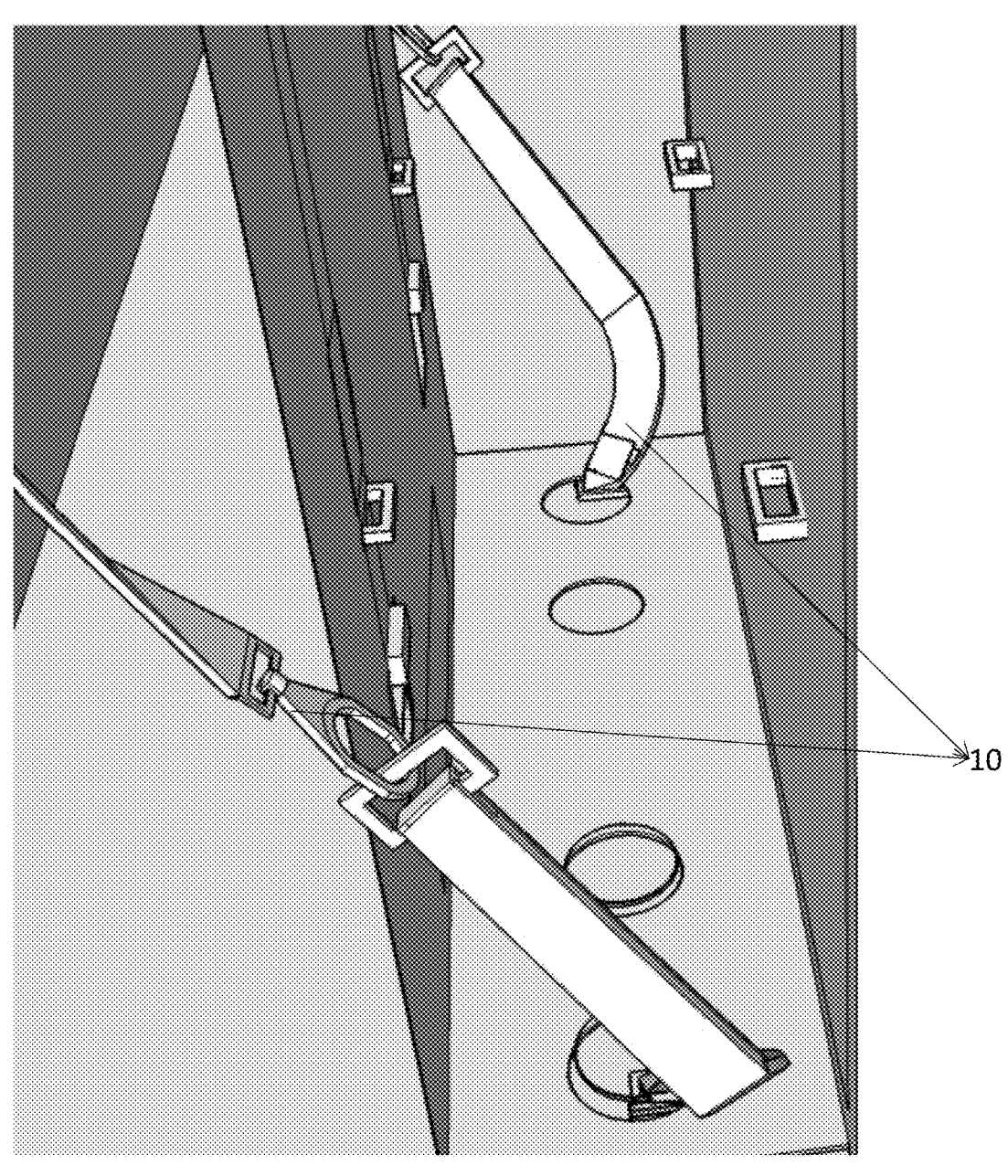
FIG. 9 shows a lower attachment point for shoulder straps.
Figure 10:
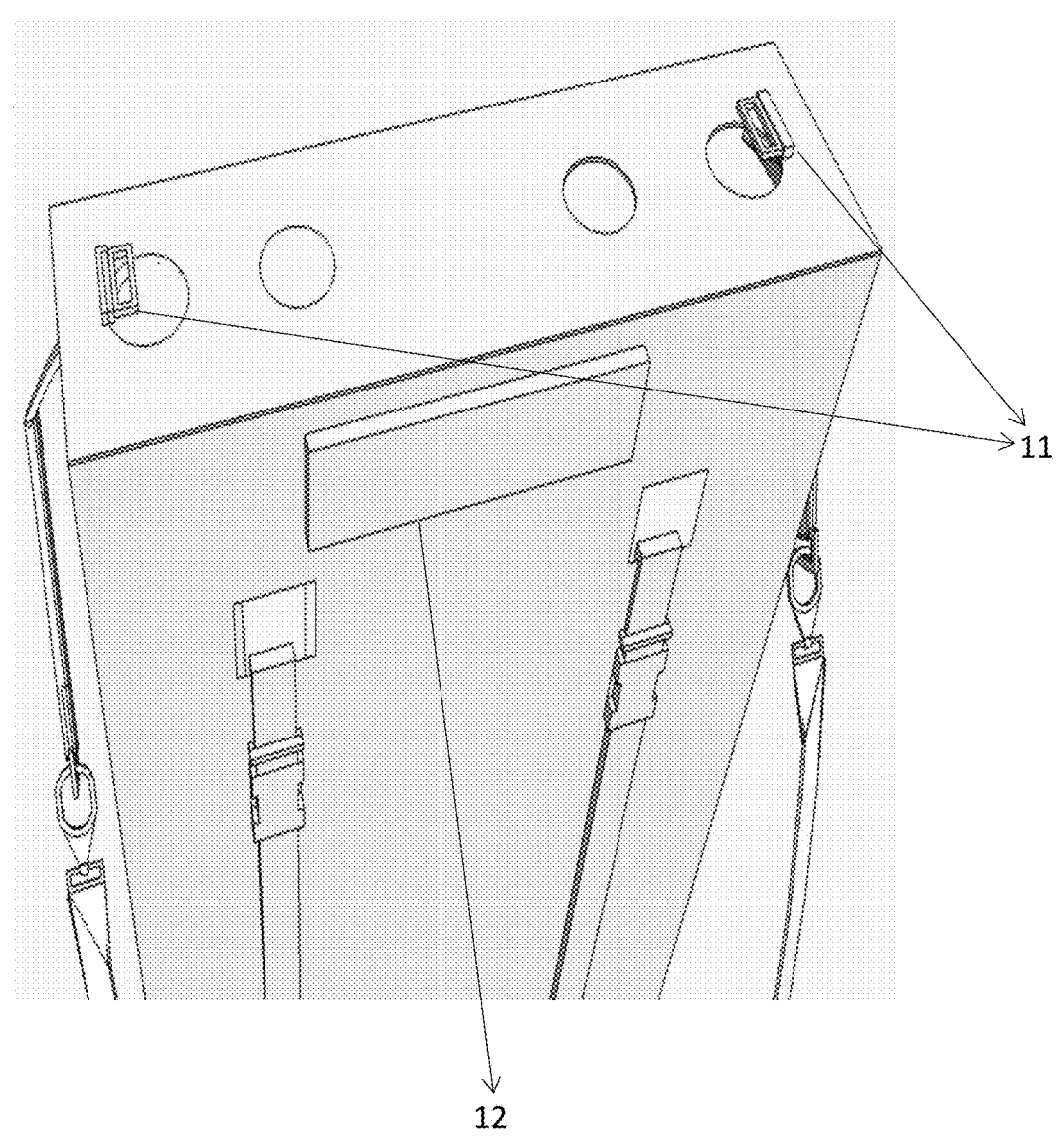
FIG. 10 shows side attachment points and a power pack.

Referring now to FIG. 1, FIG. 1 shows an example wearable media display system 1. The system 1 may include a custom-designed structure configured to be worn comfortably by a person. As shown in FIG. 2, the system may include display straps 2 for retaining components and shoulder straps 3 for wearing the system. FIG. 3 shows display clip fasteners 4 that may be used to adjust tension. Referring to FIG. 4, the system may include hologram projectors 5 attached to a metal casing 6. FIG. 5 shows an interchangeable logo display cover 7 that may be used to customize the appearance. FIG. 6 illustrates how a display screen or kiosk 8 may be positioned for placement into the metal casing. FIG. 7 shows an exploded view of the metal casing, display screen, and cover in sequential assembly order. As seen in FIG. 8, the rear of the display screen may include extruded brackets 9 for attaching straps to secure it in the casing. FIG. 9 shows a bottom attachment point 10 for the shoulder harness. FIG. 10 illustrates side attachment points 11 and a power pack 12 for system operation.

Figure 11:
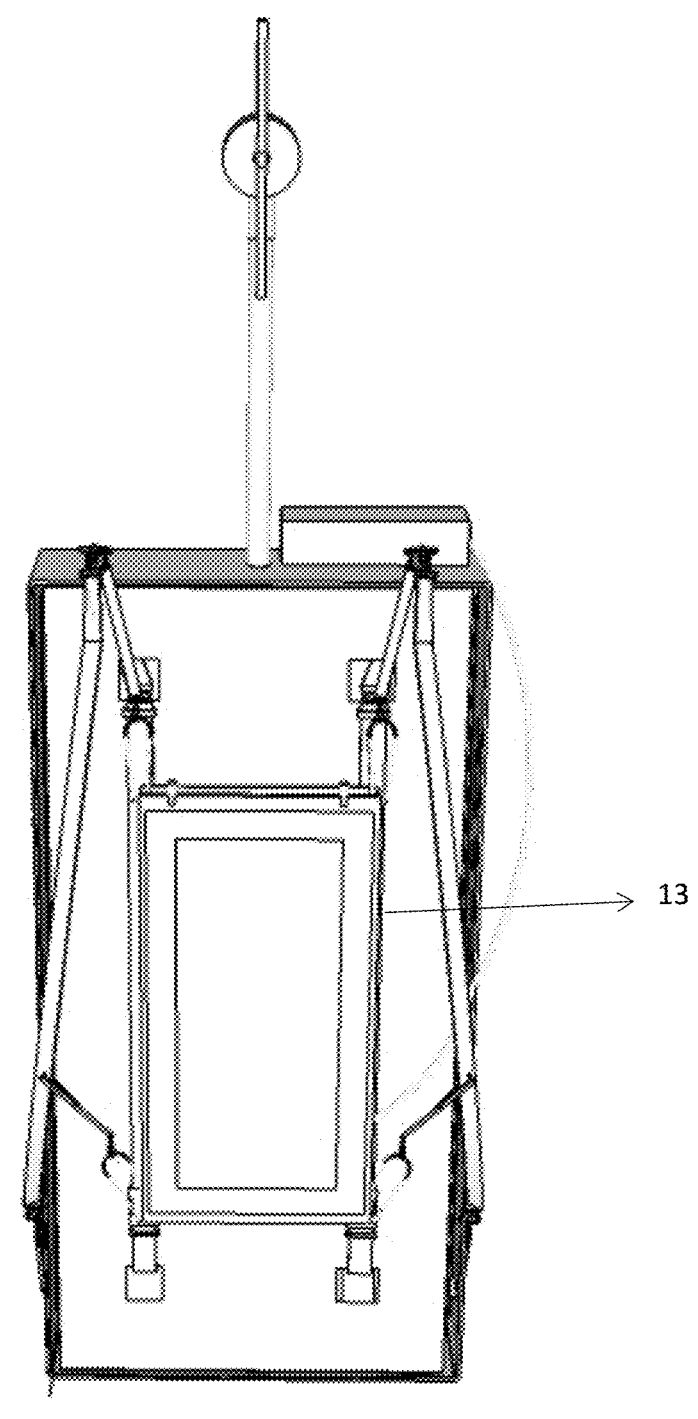
FIG. 11 shows a front view of a dual-display version of the system.
Figure 12:
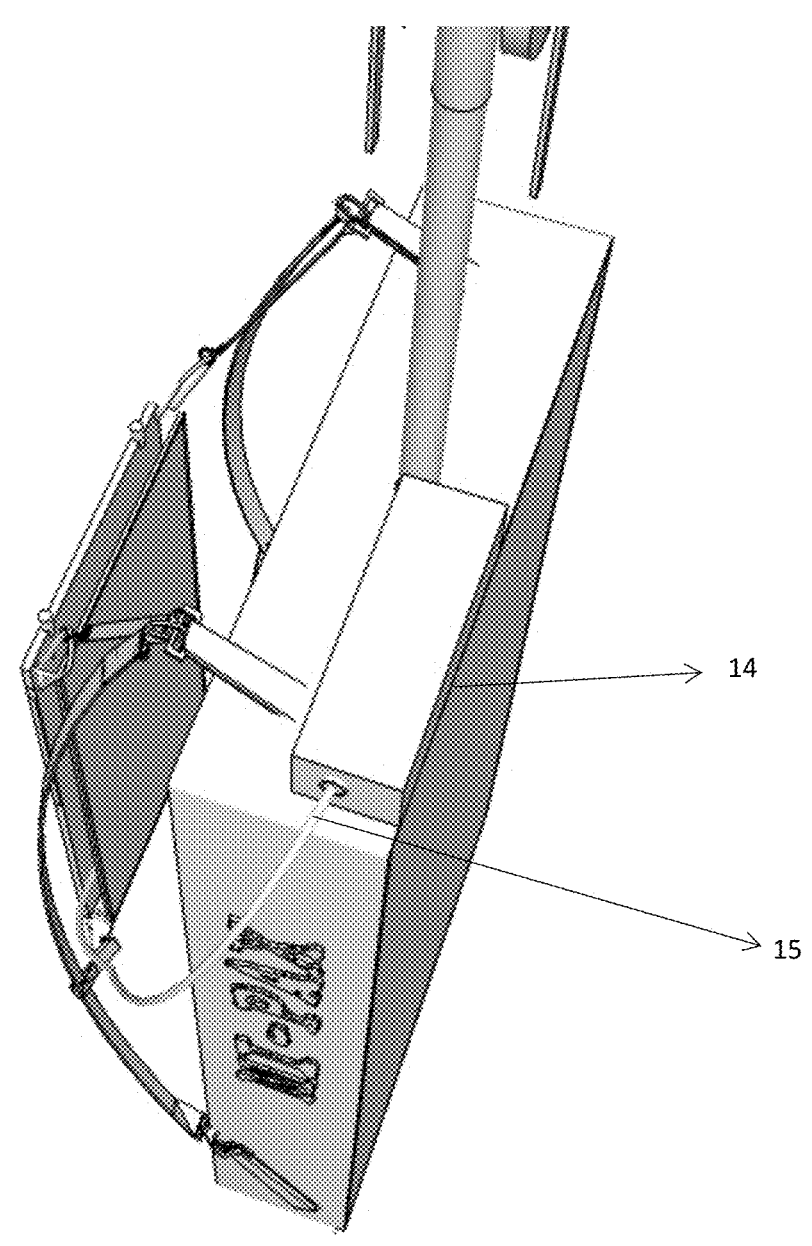
FIG. 12 shows a top view of a dual-hologram version with power connections.
Figure 13:
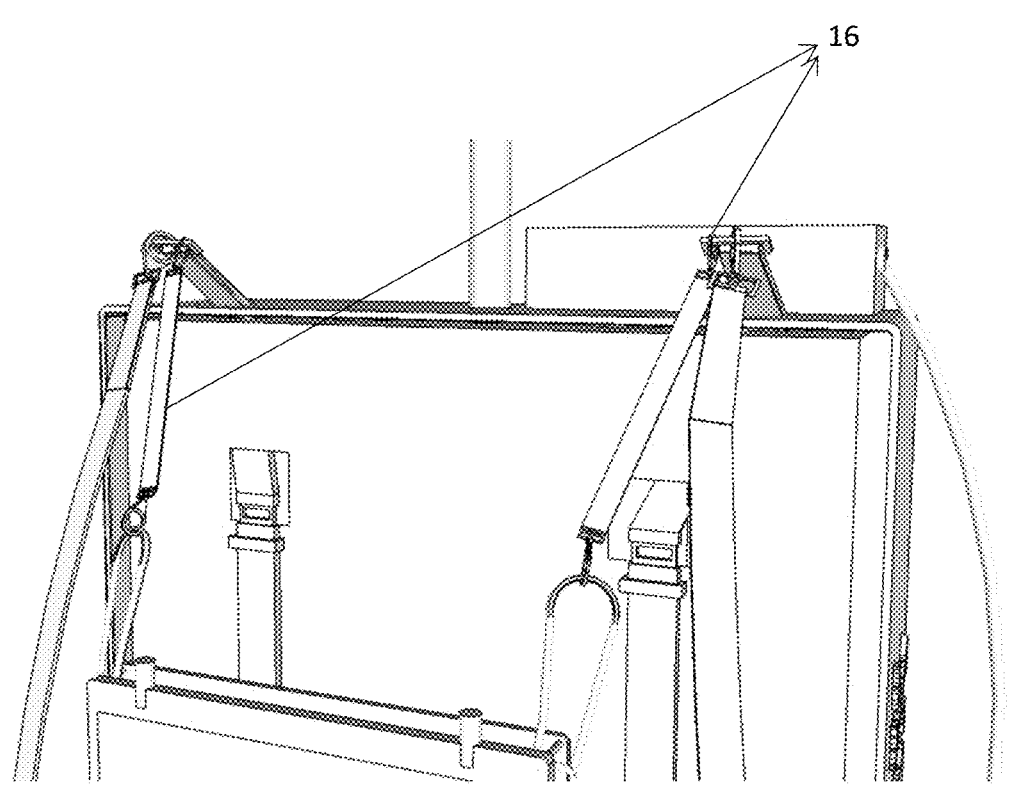
FIG. 13 shows upper harness attachments for a front display.
Figure 14:
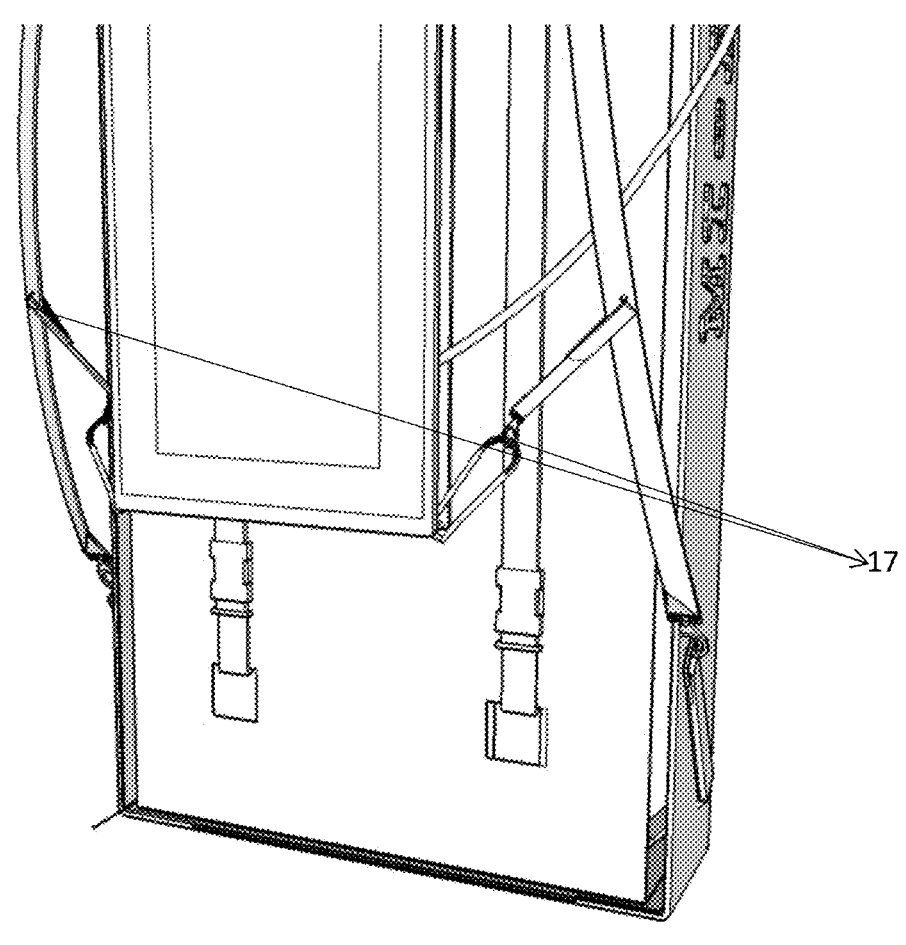
FIG. 14 shows lower harness attachments for a front display.

FIGS. 11-14 show views of an expanded version of the system. Referring to FIG. 11, FIG. 11 shows dual front-facing displays 13. FIG. 12 shows dual-facing hologram projectors and a power pack 14 with cables 15. FIGS. 13-14 show upper 16 and lower 17 harness attachments for the front displays.

In one or more embodiments, the system may include one or more 32-inch high-resolution display screens for showing media content such as video, images, or HTML. Single or dual hologram projectors may create visual displays above the wearer's head. In one or more embodiments, a custom-designed PVC board with foam padding may provide structure and comfort. A pulley system with security straps and locking devices may help distribute weight and provide stability. In one or more embodiments, custom mounting brackets may attach to the rear of the displays. A connection pole may allow attachment of the hologram projectors above the structure.

In one or more embodiments, the system may include a media player for storing and playing content. A battery pack may power the components. Optional Wi-Fi adapters or tracking devices may enable wireless connectivity. In one or more embodiments, an outer "skin" of fabric or polycarbonate may cover components and allow for customized appearance. The skin may attach via hook and loop fasteners, i.e. Velcro strips along display bezels.

In one or more embodiments, in operation, a brand ambassador may don the system and power it on. Pre-programmed media content may be loaded and displayed on the screens and via holograms. The ambassador may navigate to desired locations to engage consumers. In one or more embodiments, the system may establish wireless connections with consumer mobile devices to facilitate interaction and data collection. Collected data may be processed to generate real-time metrics.

In one or more embodiments, based on interactions or pre-set parameters, the system may adjust displays. Battery levels and performance may be monitored during use. In one or more embodiments, the wearable nature of the system may allow flexible deployment in diverse environments like public spaces, events, retail settings, or corporate locations. The eye-catching displays may attract consumer attention for brand engagement.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and quantum computing elements. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

With respect to the above description, it is to be realized that the optimum dimensional relationship for the various components of the invention described above and in the illustrations include variations in size, materials, shape, form, function, and manner of operation, assembly and use, are deemed readily apparent and obvious to one skilled in the art, and all equivalent relationships to those illustrates in the drawings and described in the specification are intended to be encompassed by the invention.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

While specific embodiments have been described, various modifications may be made without departing from the spirit and scope of the disclosure. The specific embodiments described herein are offered by way of example only.

What is claimed is:

1. A portable display apparatus comprising:
    an enclosure, having top and base portions;
    a computer processing unit (CPU), control logic, memory, in communication with said CPU, wherein said CPU, control logic, and memory are located within the enclosure;

a display apparatus positioned against the enclosure, wherein the display apparatus comprises at least one screen;

a hologram generator positioned within said enclosure, wherein said hologram generator comprises a telescopic pole extending from an upper bracket of said top portion of said enclosure for displaying a hologram above said enclosure, wherein said hologram generator is configured to generate three-dimensional holographic images visible from multiple viewing angles simultaneously;

a pulley system for stability and transport of said portable display apparatus, wherein said pulley system comprises of: a support backer board, support straps for lifting and transporting said portable display apparatus, metal clips on said support straps, and a metal bracket positioned at said base of said enclosure; and further comprising a computer programmable product which may include a non-transitory computer readable medium having control logic stored therein for causing said CPU to capture consumer data from consumer mobile devices.

2. The apparatus of claim 1, wherein the display apparatus comprises of a high-resolution media player for displaying any one or more of: video, audio, images, QR codes, HTML, interactive media.

3. The apparatus of claim 1, wherein said CPU is in communication with, and controls operation of digital, and electronic components or said portable display apparatus.

4. The apparatus of claim 1, wherein said telescopic pole of said hologram generator extends from an upper bracket of said top portion of said enclosure.

5. The apparatus of claim 1, further comprising a pouch positioned towards the base portion of said enclosure.

6. The apparatus of claim 5, further comprising a power source positioned within said pouch and for powering all powered elements of said portable display apparatus.

7. The apparatus of claim 1, further comprising a power source positioned within said enclosure and for powering all powered elements of said portable display apparatus.

8. The apparatus of claim 1, further comprising a computer programmable product which may include a non-transitory computer readable medium having control logic stored therein for causing said CPU to operate said portable display apparatus.

9. The apparatus of claim 1, wherein said CPU is configured to perform a predefined set of basic operations in response to receiving a corresponding basic instruction selected from a predefined native instruction set of code or said control logic.

10. The apparatus of claim 1, further comprising computer programmable product, control logic, methods, systems, elements configured for enabling full functioning of said portable display apparatus as disclosed in the present disclosure, drawings, and any accompanying documents.

11. A wearable media display system comprising:

a structure configured for a wearer;

at least one display screen mounted on the structure;

a dual hologram projection array attached to the structure, wherein said dual hologram projection array comprises:

a front-facing hologram projector configured to project three-dimensional holographic advertisements forward of the wearer;

a rear-facing hologram projector configured to project three-dimensional holographic advertisements behind the wearer;

wherein said front-facing and rear-facing hologram projectors are configured to operate simultaneously to create a 360-degree holographic advertising zone around the wearer, and wherein said holographic advertisements comprise interactive consumer engagement elements responsive to proximity sensors;

a media player operatively connected to the display screen and dual hologram projection array; and a battery pack for powering the system components.

12. The system of claim 11, wherein the structure comprises a custom designed PVC board with foam padding.

13. The system of claim 11, further comprising a pulley system with security straps for stabilizing the structure on the wearer.

14. The system of claim 11, comprising both forward-facing and rear-facing display screens.

15. A method of engaging consumers using a hybrid portable and wearable media display system, the method comprising:

providing a portable display apparatus comprising an enclosure with top and base portions, wherein said enclosure houses a computer processing unit (CPU), control logic, and memory, and wherein said enclosure is configured with a wearable attachment system for selective wearable operation;

configuring said portable display apparatus with a dual hologram generator system positioned within said enclosure, wherein said dual hologram generator system comprises:

a primary hologram projector configured to generate a first three-dimensional holographic image above said enclosure;

a secondary hologram projector configured to generate a second three-dimensional holographic image simultaneously with said first holographic image at a different height;

a telescopic pole extending from an upper bracket of said top portion of said enclosure supporting both hologram projectors;

mounting at least one display screen against said enclosure for coordinated display with said holographic images;

loading synchronized media content onto a media player operatively connected to said display screen and said dual hologram generator system, wherein said synchronized media content comprises coordinated two-dimensional screen displays and three-dimensional holographic advertisements;

powering said hybrid system components using a power source positioned within said enclosure and configured to support both portable and wearable operation modes;

simultaneously displaying said synchronized media content on said display screen and projecting said first and second holographic images to create an integrated advertising presentation comprising both conventional display elements and interactive three-dimensional holographic elements; and selectively operating said hybrid system in either a portable mode using a pulley system for transport or a wearable mode using said wearable attachment system while navigating to consumer locations to facilitate multi-modal consumer engagement through both screen-based and holographic advertising displays.

16. The method of claim 15, further comprising:

collecting consumer data via wireless connections established with consumer mobile devices collecting computer data;

establishing wireless connections with consumer mobile devices; and processing the collected consumer data to generate metrics.

17. The method of claim 15, further comprising adjusting the displayed content based on consumer interactions.

18. The method of claim 15, further comprising monitoring battery levels of the system during use.

* * * * *